United States Patent [19]

Mayor

[11] Patent Number: 4,498,245
[45] Date of Patent: Feb. 12, 1985

[54] ADAPTOR FOR CLAMPING OPTICAL SCALE ON TOOLING BUTTON

[75] Inventor: Robert B. Mayor, Sumner, Wash.

[73] Assignee: The Boeing Company, Seattle, Wash.

[21] Appl. No.: 509,663

[22] Filed: Jun. 30, 1983

[51] Int. Cl.³ .............................................. G01C 21/00
[52] U.S. Cl. ..................................... 33/286; 33/174 R
[58] Field of Search .................. 33/286, 288, 299, 293

[56] References Cited

U.S. PATENT DOCUMENTS

| | | |
|---|---|---|
| 1,199,355 | 9/1916 | Edmiston . |
| 1,728,893 | 9/1929 | Langsner ................................ 33/293 |
| 2,705,375 | 4/1955 | Foreman et al. ...................... 33/174 |
| 2,775,423 | 12/1956 | Strass ..................................... 33/299 |
| 2,788,578 | 4/1957 | Digiacinto ............................. 33/74 |
| 2,840,913 | 7/1958 | Houser ................................... 33/74 |
| 2,913,827 | 11/1959 | Dobson ................................ 33/293 |
| 3,546,778 | 12/1970 | Lepkowski ........................... 33/286 |
| 3,570,130 | 3/1971 | Boehm .................................. 33/74 |
| 3,704,522 | 12/1972 | Blubaugh et al. ..................... 33/286 |
| 3,755,905 | 9/1973 | Blubaugh et al. ..................... 33/286 |
| 3,909,952 | 10/1975 | Lagasse ................................ 33/286 |
| 3,911,589 | 10/1975 | Myeress ................................ 33/286 |
| 4,023,908 | 5/1977 | Johnson ................................ 33/293 |
| 4,085,512 | 4/1978 | Bod et al. ............................. 33/293 |
| 4,459,758 | 7/1984 | Halle .................................... 33/299 |

Primary Examiner—Robert I. Smith
Attorney, Agent, or Firm—Eugene O. Heberer

[57] ABSTRACT

An adaptor (18) for clamping an optical scale (20) on a tooling button (12). The adaptor (18) has two elongated rectangular plates (24, 60) pivotally engaged, one above the other, by a pair of oppositely disposed dowels (74, 76). One of the plates (24) has an opening (30) to receive a tooling button (12) therein. The plate (24) has a flat surface (54) to receive a scale (20) and a peripheral surface of the opening is cutaway (38) to permit the scale on the surface (54) to abut the tooling button. The scale is clamped in the proper tooling position by means of the upper plate (60) when it is pivoted with respect to the lower plate by means of a thumb screw (86).

14 Claims, 5 Drawing Figures

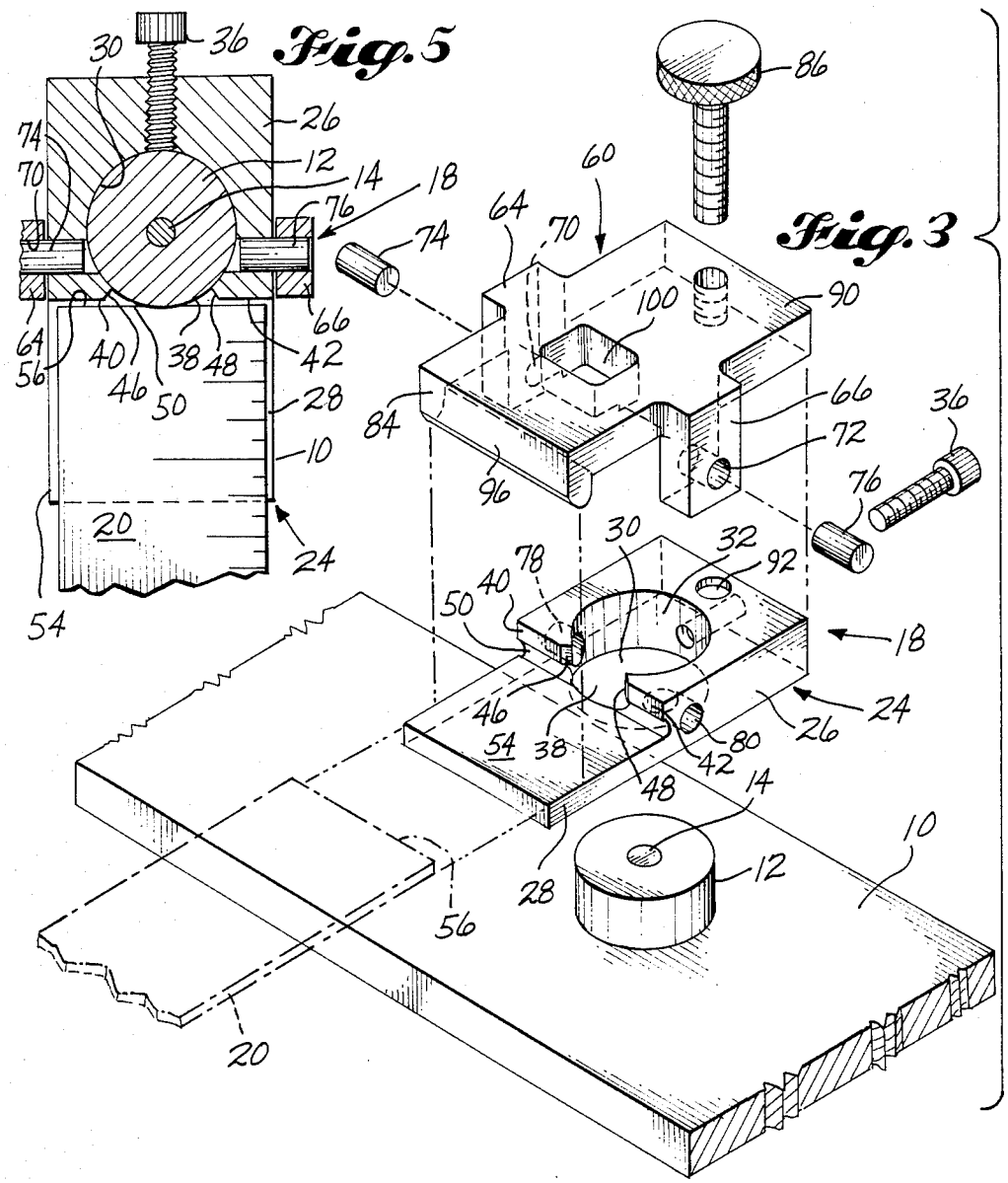
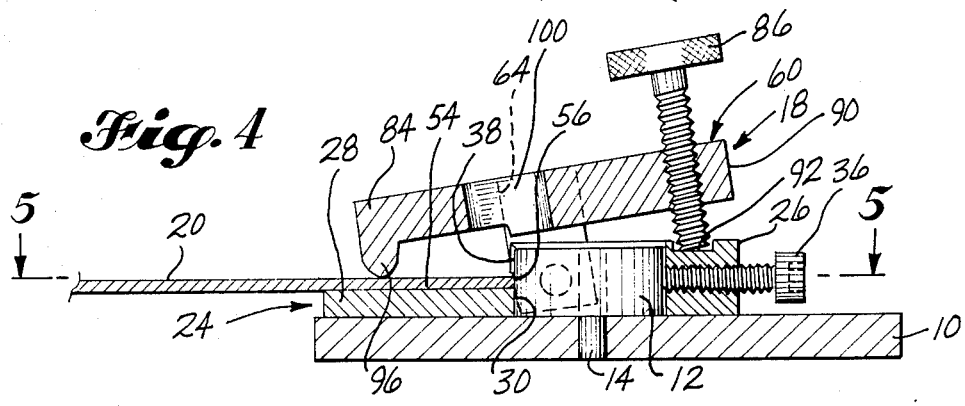

ADAPTOR FOR CLAMPING OPTICAL SCALE ON TOOLING BUTTON

DESCRIPTION

1. Technical Field

This invention relates to an adaptor clamp for properly securing an optically read scale with respect to a tooling button.

2. Background Art

Tooling buttons are used as reference points or bench marks on a large variety of master gauges, final assembly jigs, and facility gauges in large tooling and production manufacture. In the aircraft industry, the buttons may represent locations of station, buttock, and waterline positions. The tooling buttons are very accurately machined and positioned. A wide variety of optical instruments, such as transits, alignment telescopes, levels, and squares, are used to sight scales which are accurately positioned with respect to the tooling buttons.

In the prior art scales were held by hand, clamped, taped, or held with respect to the tooling button by clay. In the past these means or devices did not hold the scales accurately or would not hold them solidly. Optical tooling has become important because of its time saving and its increased accuracy. However, the optical readings could not be more accurate than the scale placement and holding.

A search of the patent literature disclosed various types of fixtures and the like utilized in optical aligning procedures. For example U.S. Pat. No. 2,840,913 illustrates the use of a holder that clamps to a tooling button and supports a scale for optical reading. The clamp is relatively complex, including three bubble levels. It has an apparent disadvantage that the clamping mechanism for the scale exerts pressure on the scale side instead of on the face of the scale. It also provides that scale fits within a dovetail slot so as to limit its width.

The other patents found are listed below.

U.S. Pat. No. 1,199,355, granted Sept. 26, 1916, to R. H. Edmiston;
U.S. Pat. No. 2,705,375, granted Apr. 5, 1955, to L. G. Foreman et al;
U.S. Pat. No. 2,788,578, granted Apr. 16, 1957, to S. Digiacinto;
U.S. Pat. No. 3,570,130, granted Mar. 16, 1971, to S. Boehm;
U.S. Pat. No. 3,704,522, granted Dec. 5, 1972, to Blubaugh et al;
U.S. Pat. No. 3,755,905, granted Sept. 4, 1973, to Blubaugh et al;
U.S. Pat. No. 3,911,589, granted Oct. 14, 1975, to R. Myeress; and
U.S. Pat. No. 4,085,512, granted Apr. 25, 1978, to Bod et al.

DISCLOSURE OF THE INVENTION

The invention is a very simple clamping device adapted to be secured on an accurately positioned tooling button and adapted to secure an optionally read scale in a properly aligned position in abutment with the tooling button. The scale may be of various widths and the clamping pressure of the device is applied against the face of the scale.

The clamp is formed of a first plate having an opening adjacent one end to receive a tooling button. A screw is threadedly engaged in the first plate to enter the opening and to secure the first plate on a tooling button. A flat surface portion extends on the first plate and is spaced from the one end and terminates at the other end of the plate. The flat surface portion is adjacent an inner peripheral portion of the opening, spaced from the one end.

There is a cutaway portion adjacent of the flat surface portion and is at the inner peripheral portion of the opening so that the flat surface portion is alignable with a tooling button in the opening and so that a scale on the flat surface portion may abut a peripheral surface portion of the button complementary to the opening when the scale and peripheral surface portion are within the cutaway portion.

There are means pivotally engaging a second plate to the first plate and there are means on the second plate to pivot one end thereof toward the flat surface portion of the first plate for clamping a scale thereon in abutment with the tooling button.

There is an opening through the second plate for sighting the abutment of a scale on the tooling button.

The means to pivotally engage the plates together are a pair of ears, one extending from each of two opposite edges of the second plate and extending outwardly of and toward the first plate. Each ear has a cylindrical bore to receive a dowel for rotation thereon, a dowel being centrally positioned on each of two opposite edges of the first plate extending outwardly into a respective bore in the ears.

The means to pivot the second plate is a thumb screw adjacent its other end and has a head extending away from the plates and has a shank threadedly engaged in the second plate. The shank is adapted to abut the first plate and when rotated against the first plate pivots the one of the second plate toward the flat surface portion to clamp the scale thereon.

The cutaway portion includes a clearance groove inwardly in the cutaway portion and inwardly of the flat surface portion, and extends between the flat surface portion and the inner peripheral portion of the opening in the first plate which receives the tooling button.

Both plates are elongated and generally rectangular in plan view. The opening for receiving the tooling button is in a thick portion of the first plate, the thick portion extending inwardly from the one end to a generally central portion adjacent the inner peripheral portion of the opening. The first plate has a thin portion formed along the cutaway portion, the thin portion having an upper surface portion forming substantially the flat surface portion, the flat surface portion being uninterrupted. There is an elongated transverse protrusion extending from one end of the second plate toward the flat surface portion to clamp the scale on the flat surface portion to secure the scale in abutment with the tooling button.

The clamp, according to the invention has the advantage of being able to securely and properly position the scale against the tooling button in either a vertical or horizontal position. The scale can be properly positioned with a level along side while it is being clamped. The securing and holding of the scale in proper position is achieved by merely pivoting the one plate with respect to the other by means of a single thumb screw.

The invention has been successfully used in typical optical tooling operations to align parts of an aircraft horizontal stabilizer and various fairing installation tools, for example.

Further advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes:

FIG. 3 is an exploded view of the invention;

FIG. 4 is a cross sectional end view illustrating the tooling button within the clamp, according to the invention, and the detail of the securing of the scale in the clamp in abutment with the tooling button; and FIG. 5 is a partially cross sectioned plan view, taken along the line 5—5 in FIG. 4.

BEST MODE FOR CARRYING OUT THE INVENTION

Referring again to the drawings, a final assembly jig 10 is fragmentarily illustrated in the form of a bar and a generally cylindrical tooling button 12 is accurately positioned and secured on the jig by means of a dowel or other fastener 14.

Figure 1:
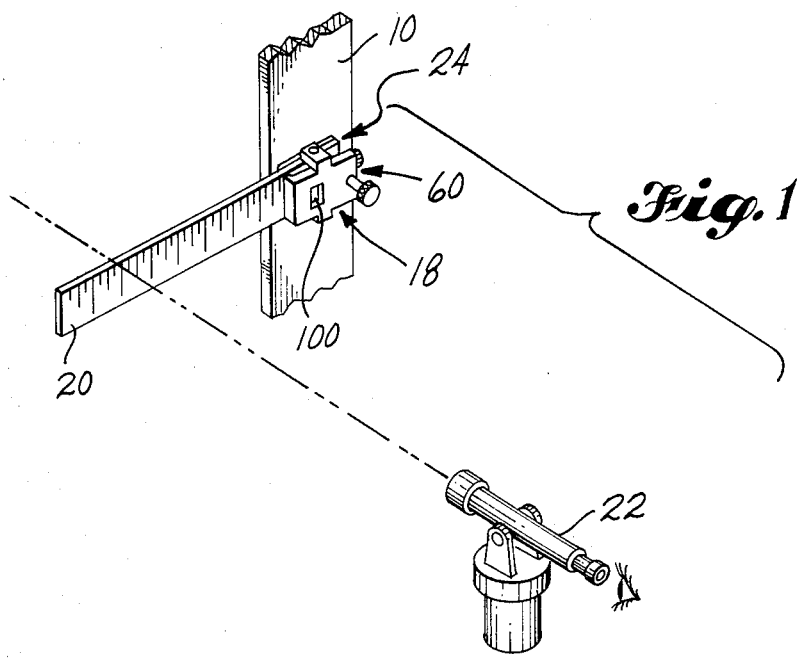
FIG. 1 is a pictorial view, in fragmentary form, showing the use of the invention.
Figure 2:
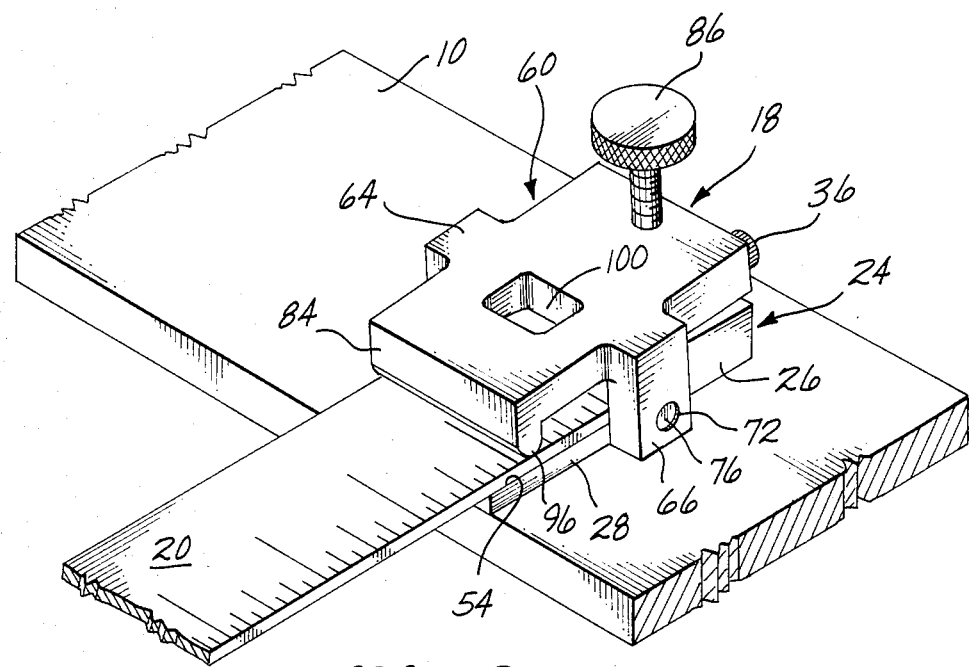
FIG. 2 is a pictorial view of the invention illustrating the clamping of a scale therein.

An adaptor clamp generally indicated as 18, according to the invention, is secured to the tooling button 12, FIG. 1-5, and in turn secures a scale 20 in abutment with the tooling button so that the scale can be read accurately with respect to the tooling button. In FIG. 1 the scale 20 is being read through an optical square 22. A level or transit may also be typically used for reading a scale. The scale can be read at any angle in that the clamp can be rotated on the tooling button.

The clamp 18 is shown in detail in FIGS. 2-5. It is comprised of an elongated, rectangular first or lower plate 24. The plate 24 has one end 26 that is relatively thick with respect to its other end 28. The end 26 has a generally cylindrical opening 30 extending therethrough, the opening 30 having a peripheral cylindrical surface 32 adapted to fit on the cylindrical surface of the tooling button 12.

The plate 24 is secured to the tooling button by means of an Allen screw 36, threadedly engaged in the thick portion 26 so as to be tightenable against the cylindrical periphery of the tooling button.

The opening 30 has a portion of its peripheral surface cutaway at 38 to expose a portion of the periphery of the tooling button when it is in the opening, as indicated in FIGS. 3-5. The cutaway portion 38 is centrally positioned with respect to the elongated direction of the plate 24 and at the inner peripheral portion of the opening with respect to the center of the plate.

The cutaway portion extends along the vertical surfaces 40, 42, 46, and 48 of the thickened portion, FIGS. 3 and 5.

Inwardly in the cutaway portion is a transverse clearance groove 50 to assure clearance for the scale 20 when it is put into an abutment position with the periphery of the tooling button through the cutaway of the periphery of the opening.

As indicated, the opening 30 extends from a position adjacent one end of the plate 24 to a central location from which extends the thin portion 28, having an upper flat surface portion 54, smoothly machined so as to provide a proper surface to secure the scale 20 in a proper level position. The cutaway 38 permits an inner end 56 of the scale to be positioned in abutment with the periphery of the tooling button 12. The scale may typically be properly positioned by means of a level.

An upper or second plate generally designated as 60 is elongated and rectangular to generally conform with the configuration of the lower plate 24 in plan. Centrally in the elongated direction and transversely of the plate are a pair of opposite ears 64 and 66 extending downwardly along side the thickened portion of the lower plate 24. The ears have cylindrical openings 70 and 72 to receive dowels 74 and 76, respectively, which are press fit in bores 78 and 80 in the plate 24. The plate 60 is thereby pivotally engaged on the dowels with the plate 24. One end 84 is adapted to be pivoted toward the flat surface portion 54 and a scale thereon by means of thumb screw 86 threadedly engaged in the plate adjacent its other end 90. When the thumb screw 86 is rotated clockwise and downwardly through the plate it enters a recess 92 so as to cause the plate 60 to be pivoted on the dowels.

Extending transversely across the end 84 is a downwardly extending transverse protrusion 96 having a smoothly machined lower face parallel to the surface 54 and parallel to the surface of a scale 20 on the latter surface.

A generally rectangular opening 100 extends through the upper plate just above the cutaway area 38 so that the position of the scale with respect to the tooling button can be seen from above the upper plate. Thus, when the scale is being positioned on the tooling button and being clamped thereto by the action of the thumb screw 86 by the holding pressure of the lower end of the protrusion 96, the contact of the scale on the tooling button can be visualized and a feeler gauge is used from the side, as viewed in FIG. 4, and can be seen through the opening 100 to make sure that the end 56 is in proper abutment with the button. As indicated, the scale 20 is otherwise positioned by means of a level or some optical tool. The scale can be positioned in any direction by means of rotation of the clamp on the tooling button.

From the foregoing it is seen that the very simple clamp, according to the invention, provides an excellent device for accurately and fixedly securing a scale with respect to a tooling button for optical reading.

The invention and its attendant advantages will be understood from the foregoing description and it will be apparent that various changes can be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. For use in positioning optically read scales on tooling button-type bench marks, an adaptor clamp comprising:

a first plate having an opening adjacent one end to receive a tooling button;

means attached to said first plate to secure said first plate on said button;

a flat surface portion of said first plate spaced from said one end and being adjacent an inner peripheral portion of said opening spaced from said one end;

a cutaway portion adjacent said flat surface and at said inner peripheral portion of said opening to align said flat surface with a button in said opening so that a scale on said flat surface may abut a peripheral surface portion of said button complementary to said opening when the scale and peripheral surface portion are within the cutaway portion;

means pivotally engaging a second plate to said first plate; and means on said second plate to pivot one end thereof toward said flat surface of said first plate for clamping a scale thereon in abutment with said tooling button.

2. The invention according to claim 1 including:

an opening through said second plate for sighting abutment of a scale on a tooling button.

3. The invention according to claim 1 including:

an elongated protrusion extending from said one end of said second plate toward said flat surface portion to clamp said scale on said flat surface to secure the same in said abutment.

4. The invention according to claim 1 in which said means to pivotally engage include:

an ear generally centrally on each of two opposite edges of said second plate extending outwardly of and toward said first plate;

each ear having a cylindrical bore to receive a dowel for rotation thereon; and a dowel generally centrally on each of two opposite edges of said first plate extending outwardly into a respective bore in said ears.

5. The invention according to claim 4 in which:

said means to pivot on said second plate is a thumb screw adjacent the other end having a head extending away from said plates and having a shank threadedly engaged in said second plate, the shank being adapted to abut the first plate, and when rotated against the first plate, pivots the one end of the second plate toward the flat surface portion to clamp a scale thereon.

6. The invention according to claim 1 in which:

said means attached to said first plate is a screw in the first plate adapted to make holding contact with the button.

7. The invention according to claim 1 in which said cutaway portion includes:

a clearance groove inwardly in said cutaway portion and inwardly of said flat surface portion, and between said flat surface portion and said inner peripheral portion of opening.

8. The invention according to claim 1 in which:

said first plate is elongated and generally rectangular in plan;

said opening being in a thick portion of said first plate, the thick portion extending inwardly from said one end of the first plate to a generally central portion adjacent the inner peripheral portion of the opening;

a thin portion of said first plate formed along said cutaway portion and having an upper surface formed substantially of said flat surface portion; said flat surface being uninterrupted;

an opening through said second plate for sighting abutment of a scale on a tooling button;

said second plate being elongated and generally rectangular in plan and extending over said first plate in the elongated and transverse directions; and an elongated transverse protrusion extending from said one end of said second plate toward said flat surface portion to clamp said scale on said flat surface to secure the same in said abutment.

9. For use in positioning optically read scales on tooling button-type bench marks, an adaptor clamp comprising:

an elongated first plate having an opening adjacent one end to receive a tooling button;

said opening being in a thick portion of said first plate, the thick portion extending inwardly from said one end of the first plate to a generally central portion adjacent an inner peripheral portion around the opening;

a reduced thickness portion of said first plate having a flat surface portion extending from the other end inwardly toward the opening to a generally central portion adjacent an inner peripheral portion around the opening;

said thick portion having a cutaway portion at said inner peripheral portion around said opening to expose a part of the opening and a part of the periphery of a tooling button in the opening;

said cutaway portion and exposed part of the opening being aligned with said flat surface so that a scale thereon may abut said part of the tooling button;

means pivotally engaging a second elongated plate to said first plate; and means on said second plate to pivot one end thereof toward said flat surface of said first plate for clamping a scale thereon in abutment with said tooling button.

10. The invention according to claim 9 including:

an elongated transverse protrusion extending from said one end of said second plate toward said flat surface portion to clamp said scale on said flat surface to secure the scale in said abutment.

11. The invention according to claim 9 including:

a screw in the first plate adapted to enter the opening through its periphery and engage the periphery of a tooling button to secure the first plate to the button.

12. The invention according to claim 10 in which:

said flat surface portion extends transversely to the elongation of the first plate for the width thereof.

13. The invention according to claim 12 including:

a transverse clearance groove extending along an inner edge of said flat surface portion and along an inner edge of the thick portion;

said opening extending into said groove at said cutaway portion.

14. The invention according to claim 13 in which:

said first and second plates are generally rectangular in plan;

said plates being juxtaposed;

an opening through said second plate for sighting abutment of a scale on a tooling button.

* * * * *

UNITED STATES PATENT AND TRADEMARK OFFICE
CERTIFICATE OF CORRECTION

PATENT NO. : 4,498,245
DATED : February 12, 1985
INVENTOR(S) : Robert B. Mayor

It is certified that error appears in the above-identified patent and that said Letters Patent are hereby corrected as shown below:

Column 1, line 60, "optionally" should be --optically--.

Column 6, line 30, --portion-- should be added following "surface".

Signed and Sealed this

Thirtieth Day of July 1985

[SEAL]

Attest:

DONALD J. QUIGG

Attesting Officer    Acting Commissioner of Patents and Trademarks